United States Patent [19]

Uyetake et al.

[11] 3,992,123
[45] Nov. 16, 1976

[54] PIPE END MACHINING APPARATUS

[75] Inventors: Tadao Uyetake, Honolulu; Teikichi Higa, Pearl City; Stephen Orillo, Jr, Wahiawa; Gregory S. Nakano, Pearl City, all of Hawaii

[73] Assignee: The United States of America as represented by the Secretary of the Navy, Washington, D.C.

[22] Filed: Oct. 1, 1975

[21] Appl. No.: 618,725

[52] U.S. Cl. .................. 408/104; 82/4 C; 408/240
[51] Int. Cl.² ......................... B23B 39/00
[58] Field of Search ............. 408/72, 54, 80, 82, 408/104, 105, 106, 117, 118, 138, 240; 82/4 C; 269/135, 156, 265, 266, 268, 270

[56] References Cited
UNITED STATES PATENTS

| | | | |
|---|---|---|---|
| 938,058 | 10/1909 | Johnston | 408/80 |
| 1,590,459 | 6/1926 | Vondersaar | 408/104 |
| 1,938,987 | 12/1933 | Vosper | 408/104 |
| 2,478,310 | 8/1949 | Payne | 408/80 X |
| 2,672,682 | 3/1954 | Studebaker et al. | 82/4 C |
| 3,561,302 | 2/1971 | Keener | 82/4 C |
| 3,875,831 | 4/1975 | Beauloye | 82/4 C |

FOREIGN PATENTS OR APPLICATIONS

| | | | |
|---|---|---|---|
| 1,552,312 | 6/1969 | Germany | 82/4 C |
| 2,025,604 | 12/1971 | Germany | 269/266 |

*Primary Examiner*—Francis S. Husar
*Assistant Examiner*—W. R. Briggs
*Attorney, Agent, or Firm*—Richard S. Sciascia; Ervin F. Johnston

[57] ABSTRACT

An apparatus for machining pipe ends which includes an annular housing which is adapted to receive a pipe end. A plurality of rods are threaded radially through the housing and are adjustable inwardly for engaging the pipe so as to enable axial alignment of the housing with the pipe end. A chuck is slidably mounted within the cylindrical housing for longitudinal reciprocal movement toward and away from the pipe end. The chuck is also rotatably mounted within the housing. A large nut may be threaded on the housing for positioning and retaining the chuck at selected locations along the longitudinal axis of the housing. One or more tool bits are located at one end of the chuck for machining the end of the pipe when the chuck is rotated within the housing.

9 Claims, 6 Drawing Figures

PIPE END MACHINING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Most large ships contain miles of piping which serve the purposes of fresh water, sewage, and steam for heating and power. These pipes are normally routed close together in order to conserve shipboard space. As these pipes serve the various locations aboard the ship they take many 90° turns from the main routing channels.

When a ship goes in for an overhaul or even minor repair work piping systems are often cut for rerouting or spliced to replace deteriorated pipe sections. When new sections are added this work necessarily requires the pipe ends to be prepared for a welding process. The butt welded pipe ends normally require the internal circumference of the pipe ends to be dressed to a specific degree to accept a consumable type weld backing ring, and the pipe ends are further dressed along an external circumference in a bevelled fashion to accept a filler welding material which completes the joining of the pipe ends together.

The prior art apparatus for performing the necessary machining operations on pipe ends has been too large to get into the many confined spaces of the closely routed piping systems aboard ships. Further, these prior art devices were not useable at all on pipe ends which terminate in a 90° bend. In many instances it has been necessary to manually grind these pipe ends to the desired configurations for butt welding of the pipe ends.

SUMMARY OF THE INVENTION

The present invention provides an apparatus which will efficiently machine pipe ends which terminate in 90° bends or are in close quarters with respect to other pipes or components. This has been accomplished by providing an annular housing which is adapted to receive the pipe end. A plurality of rods are threaded radially through the housing and are adjustable inwardly for engaging the pipe so as to enable axial alignment of the housing with the pipe end. A chuck is slidably mounted within the housing for longitudinal reciprocal movement toward and away from the pipe end. The chuck is also rotatably mounted within the housing. A large nut may be threaded on the housing for positioning and retaining the chuck at selected locations along the longitudinal axis of the housing. One or more tool bits are located at one end of the chuck for machining the end of the pipe when the chuck is rotated within the housing. With this arrangement the machining apparatus can be kept very compact for machining pipe ends in confined areas as well as attachment to a 90° bend in the pipe for machining a pipe end at the end of the 90° bend.

OBJECTS OF THE INVENTION

An object of the present invention is to overcome the aforementioned problems associated with prior art pipe end machining apparatuses.

Another object is to provide a compact pipe end machining apparatus which can be operated in confined spaces where the pipe is in close proximity to other pipes or components.

Another object is to provide a pipe end machining apparatus which can be attached to a 90° bend in the pipe for machining a pipe end terminating therefrom.

These and other objects of the invention will become more readily apparent from the ensuing specification when taken together with the drawings.

DESCRIPTION OF THE PREFERRED EMBODIMENT

Figure 1:
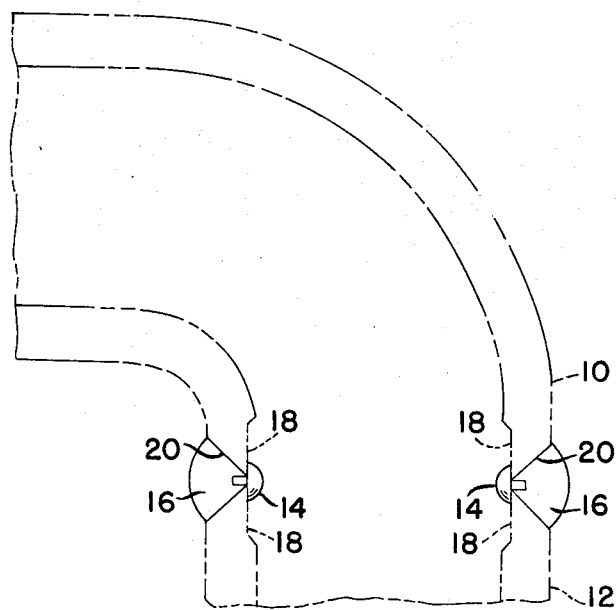
FIG. 1 is a cross sectional phantom view of a pair of pipe ends which have been machined and joined by a butt weld.

Referring now to the drawings wherein line reference numerals designate like or similar parts throughout the several views, there is illustrated in FIG. 1 a pair of pipe ends 10 and 12 which are butt welded together by a welding material backing ring 14 and a filler welding material 16. In the welding process the backing ring 14 and the filler material 16 become integral and the head of the backing ring 14 spreads out along the inner circumference of the pipes 10 and 12 to join the ends of the pipes together.

In order to provide space for the material of the backing ring 14 the inner circumference of each of the pipe ends are machined to provide annular recesses 18, as illustrated in FIG. 1. Further, each of the pipe ends is machined to form a bevel 20, as illustrated in FIG. 1, for providing space for the filler welding material 16.

These machining processes are difficult to perform in confined or crowded areas, such as aboard ship where the piping systems are often routed very close together or located in close proximity to bulkheads or other ship components. Many pipe ends have been dressed by grinding processes since prior art machining devices have been too bulky to get into an operable position. Further, the prior art machining devices have not been capable of proper alignment and attachment to a pipe such as pipe 10 which has a 90° bend.

The present invention overcomes the problems associated with the prior art machining devices by providing an apparatus 22 which is capable of machining pipe ends in close and crowded quarters even though the pipe ends terminate from a 90° bend. After attachment to the pipe end the machining apparatus 22 will machine both the inner circumference and the end of the pipe in preparation for the welding process illustrated in FIG. 1.

Figure 2:
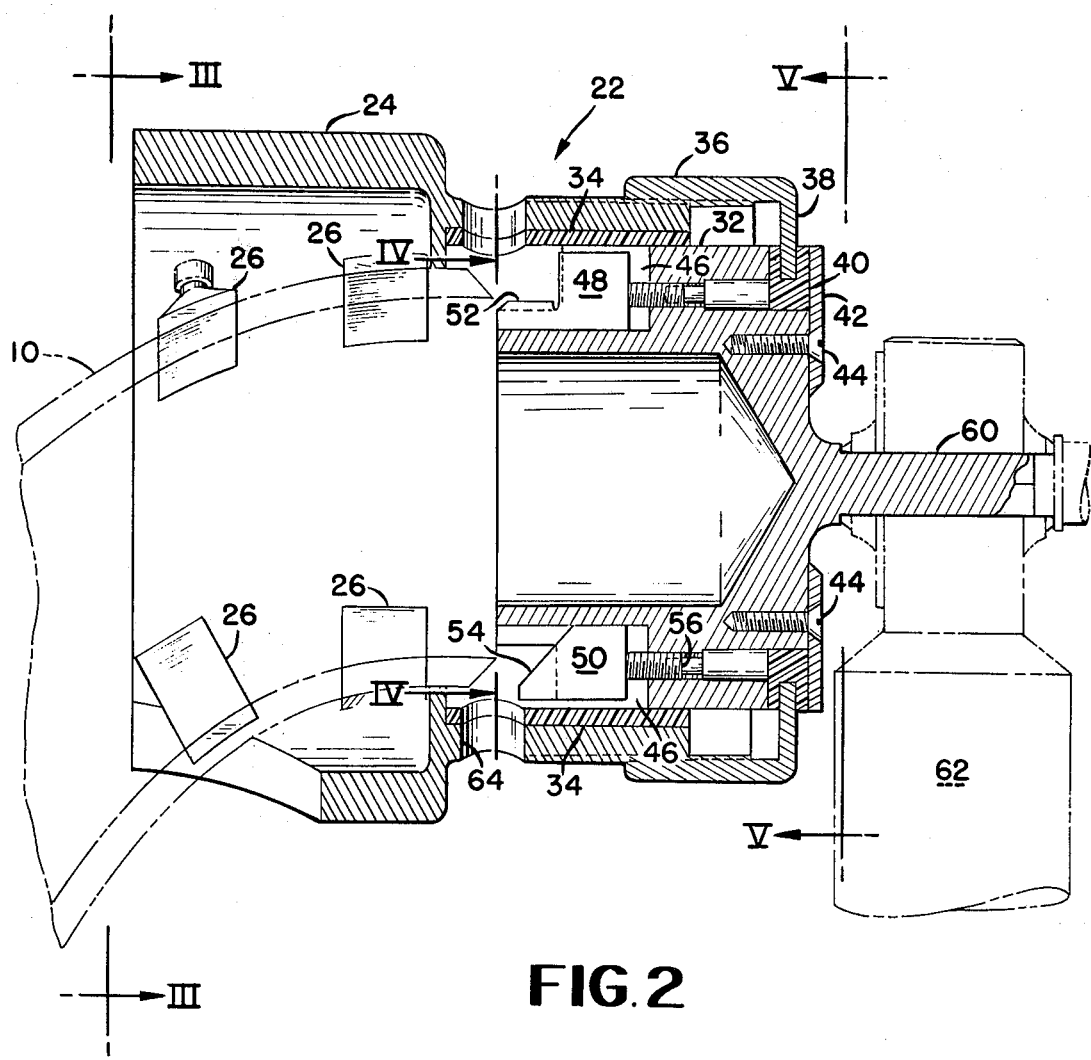
FIG. 2 is a side view of the pipe end machining apparatus shown in cross section with a 90° elbow of a pipe end and a motor shown in phantom.
Figure 3:
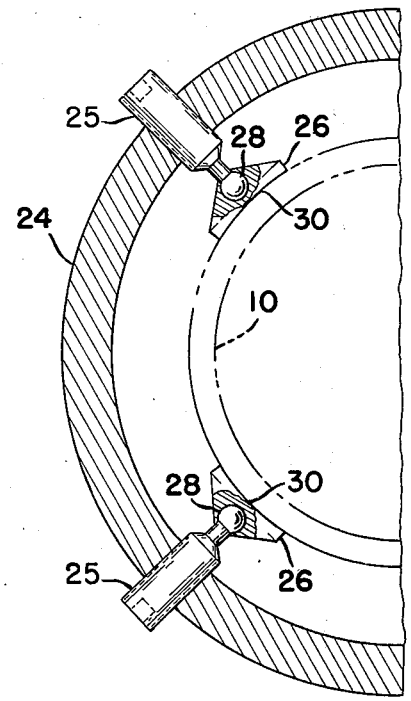
FIG. 3 is a one half cross-sectional view taken along plane-III—III of FIG. 2.

The apparatus 22 may include an annular housing 24 which is adapted to receive a pipe end, such as the pipe end 10 which terminates from a 90° bend. It is important that the machining apparatus 22 be retained in axial alignment with the pipe end so that the machining can be accurately performed. This may be accomplished by a plurality of rods 25 (see FIG. 3) which are threaded radially through the housing 24 and are adjustable inwardly for engaging the exterior surface of the pipe 10. By properly adjusting these rods, the housing 24 can be axially aligned with the center point of the end of either pipe 10 or 12. This function is enhanced by providing a pad 26 which is mounted by a ball and socket joint 28 to the inner end of each rod 25. It is preferred that the inner foot 30 of each of these pads have a curvature which corresponds to the curvature of the exterior surface of the pipe 10 or 12. In this manner, the operator can engage the pads 26 with the pipe and tighten down of the rods 25 to securely retain the apparatus 22 to the pipe for the subsequent machining operations. Further, it has been found desirable to provide a pair of annular rows of rods 25 and pads 26, as illustrated in FIG. 2, which are longitudinally spaced from one another along the housing 22. This arrangement provides a tight retention of the apparatus 22 to the pipe since engagement is on two spaced apart planes along the length of the pipe.

As illustrated in FIG. 2, the machining apparatus 22 is further provided with a chuck 32 which is slidably mounted within the housing 24 for longitudinal reciprocal movement toward and away from the pipe end. This slidably mounting may be provided by a nylon bearing 34 which is located between the interior surface of the housing 24 and the exterior surface of the chuck 32. The bearing 34 also provides for rotatable movement of the chuck 32 in the housing 24 which is necessary for the machine cutting operations which will be described hereinbelow.

In order to advance and withdraw the chuck 32 with respect to the pipe end, means are provided for positioning and retaining the chuck 32 at selected locations along the longitudinal axis of the housing 24. This positioning and retaining means may be a large nut 36 which is threaded on the exterior surface of the housing 24. The nut 36 may be provided with an inwardly extending lip 38 which extends within the chuck 32 for slidable rotative movement with respect thereto. This arrangement will enable the nut 36 to move the chuck 32 toward or away from the pipe end depending on the direction in which the nut is threaded on the housing 24. This mounting may be accomplished by providing a bushing ring 40 which is disposed within an annular recess in the outer end of the chuck 32, and which is held in place by an annular retaining ring 42 which is secured to the outer end of the chuck 32 by bolts 44. As shown in FIG. 2 the lip 38 extends within an annular recess within the bushing ring 40.

The inner end of the chuck 32 may be provided with a plurality of radially extending slots 46 for receiving tool means to perform the machining operations on the pipe end. The tool means may comprise tool bits 48 and 50, each tool bit being disposed within a respective slot 46 of the chuck 32. The tool bit 48 may be provided with a longitudinally extending cutting edge 52 for cutting the interior surface of the pipe, and the tool bit 50 may be provided with a diagonally extending cutting edge 54 for beveling the end of the pipe. In the embodiment illustrated a total of six tool bits are employed, with the bits 48 and 50 arranged in an alternate fashion about the inner end of the chuck 32.

Figure 4:
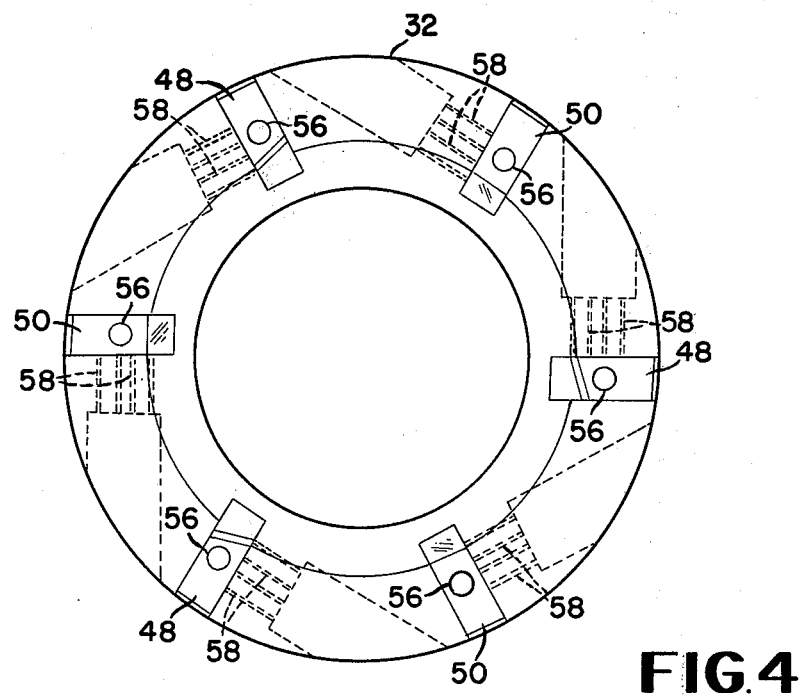
FIG. 4 is a cross-sectional view taken along plane IV—IV of FIG. 2.
Figure 5:
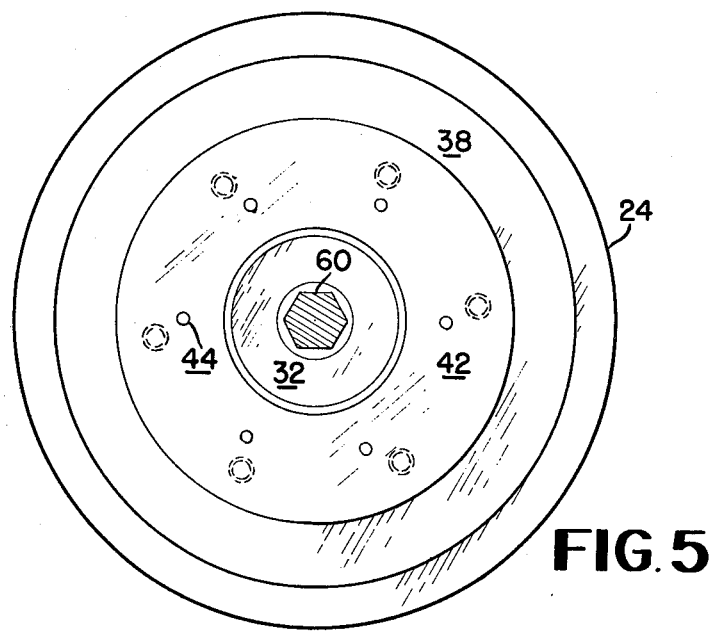
FIG. 5 is a cross-sectional view taken along V—V of FIG. 2.

In order to adjust the longitudinal positions of the tool bits 48 and 50, a bolt 56 may be threaded longitudinally through the chuck 32 into each of the slots 46. Further, the tool bits 48 and 50 may be retained in their positions by additional bolts 58 (see FIG. 4) which are threaded diagonally through the chuck 32 into each of the slots 46. While the bolts 56 bear against the end of the tool bits 48 and 50 for longitudinal positioning, the bolts 58 bear against the side of the bits for retaining the bits in their desired positions.

The other end of the chuck 32 may be provided with a centrally located stud 60 which extends outwardly beyond the housing 24 for receiving the power head of an air motor 62. Operation of this motor causes the chuck 32 to rotate within the housing 24 resulting in a cutting operation of the tool bits 48 and 50 on the end of the plate 10. Inspection holes 64 may be provided within the housing 24 adjacent the cutting edges of the tool bits for visually inspecting the machining operation.

Figure 6:
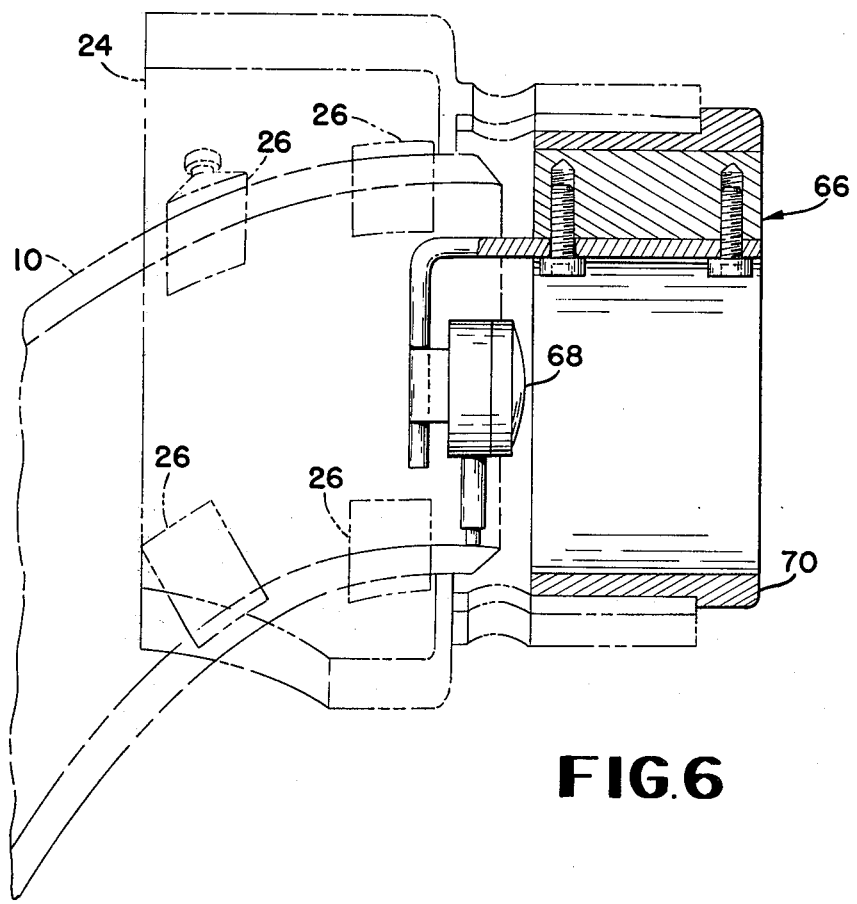
FIG. 6 is a cross-sectional view of a fixture for aligning the pipe end machining apparatus axially with the end of a pipe elbow which is shown in phantom.

In order to axially align the housing 24 with the center of the end of the pipe 10 a fixture 66 (see FIG. 6) may be employed. The fixture 66 is mounted within the housing 24 in place of the chuck 32 and includes a dial indicator 68 which is mounted to a ring 70 which, in turn, is rotatably mounted within the outer end of the housing 24. The pads 26 are then adjusted in engagement with the exterior surface of the pipe 10 until the dial 68 provides a constant indication as the ring 70 is rotated within the housing 24. When such a reading is obtained the housing 24 is axially aligned with the pipe end and the fixture 66 may then be removed for insertion of the chuck 32 and commencement of the machining operations.

Obviously, many modifications and variations of the present invention are possible in the light of the above teachings, and, it is therefore understood that within the scope of the disclosed inventive concept, the invention may be practiced otherwise than specifically described.

What is claimed is:
1. An apparatus for machining pipe ends comprising:
    an annular housing which is adapted to receive a pipe end;
    a plurality of rods threaded radially through the housing and adjustable inwardly for engaging the pipe so as to enable axial alignment of the housing with the pipe end;
    chuck means slidably mounted within the housing for longitudinal reciprocal movement toward and away from the pipe end;
    said chuck means also being rotatably mounted within said housing;
    tool means located at one end of the chuck means for machining the end of the pipe when the chuck means is rotated within said housing;
    a nut which is threaded on the exterior surface of the housing;
    said nut having an inwardly extending annular lip; and
    said lip extending within the chuck means for slidable rotative movement so that the nut will move the chuck means toward or away from the pipe end depending on the direction in which the nut is rotated.
2. An apparatus as claimed in claim 1 including:

a pad mounted by a ball and socket joint to the inner end of each rod for engaging the exterior surface of the pipe.

3. An apparatus as claimed in claim 1 including:
at least a pair of annular rows of rods longitudinally spaced from one another along the housing, each row having a plurality of said rods threaded radially through the housing.

4. An apparatus as claimed in claim 3 including:
a pad mounted by a ball and socket joint to the inner end of each rod for engaging the exterior surface of the pipe.

5. An apparatus as claimed in claim 4 including:
the inner foot of each pad having a curvature which corresponds with the curvature of the exterior surface of the pipe.

6. An apparatus as claimed in claim 1 including:
said one end of the chuck means having a plurality of radially extending slots;
said tool means comprising a tool bit mounted in each of said slots; and
at least one of the tool bits having a longitudinally extending cutting edge for cutting an interior surface of the pipe, and at least another one of the tool bits having a diagonally extending cutting edge for beveling the end of said pipe.

7. An apparatus as claimed in claim 6 including:
a bolt threaded longitudinally through the chuck means into each slot for adjusting the longitudinal position of a respective tool bit; and
a bolt threaded diagonally through the chuck means into each slot for retaining the position of a respective tool bit.

8. An apparatus as claimed in claim 7 including:
at least a pair of annular rows of rods longitudinally spaced from one another along the housing, each row having a plurality of said rods threaded radially through the housing;
a pad mounted by a ball and socket joint to the inner end of each rod for engaging the exterior surface of the pipe; and
the inner foot of each pad having a curvature which corresponds with the curvature of the exterior surface of the pipe.

9. An apparatus as claimed in claim 8 including:
the other end of the chuck means having a centrally located stud which extends beyond the housing for engaging a motor to power said chuck means.

* * * * *